Patented Apr. 10, 1934

1,954,429

UNITED STATES PATENT OFFICE 1,954,429

PROPYL-METHYL CARBINYL ALLYL BARBITURIC ACID AND ITS SALTS

Horace A. Shonle, Indianapolis, Ind., assignor to Eli Lilly and Company, Indianapolis, Ind., a corporation of Indiana No Drawing. Application January 22, 1934,
Serial No. 707,781. In Canada August 2, 1930

3 Claims. (Cl. 260—33)

This application is a continuation in part of my copending applications Serial Nos. 387,084 and 593,201, filed respectively on August 19, 1929, and February 15, 1932.

It is the object of my present invention to produce propyl-methyl-carbinyl allyl barbituric acid, (also called allyl 1-methyl-butyl barbituric acid,) and its salts.

The new propyl-methyl-carbinyl allyl barbituric acid and its salts have pronounced hypnotic action. They are all represented by the following formula:

(1) 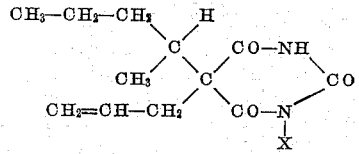

in which X represents either hydrogen (if the compound is an acid), or either an alkali metal, such as sodium, or its equivalent of an alkaline-earth metal, such as calcium or magnesium, or ammonium, or a mono- or di-alkyl-substituted ammonium, such as —NH₃—CH₃ or

—NH₂(C₂H₅)₂, (if the compound is a salt). Thus propyl-methyl-carbinyl allyl barbituric acid has the formula:

(2) 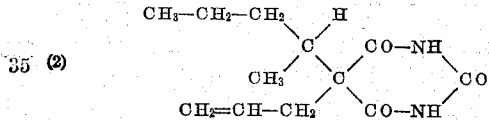

My first preparation of propyl-methyl-carbinyl allyl barbituric acid was somewhat impure; although I did not then appreciate that such was the case; and that was what was described as the acid itself in my aforesaid parent application Serial No. 387,084; and also in my other parent application Serial No. 593,201, which in this respect is a continuation of application Serial No. 387,084.

The purer propyl-methyl-carbinyl allyl barbituric acid may be obtained from the less pure one by simply carrying further the recrystallization of the barbituric acid. It may also be obtained by preventing to a greater or less extent an isomerization which tends to occur in its preparation, largely in the preparation of the 2-bromo-pentane used as an intermediate. This tendency to isomerize was pointed out and discussed in a paper by Shonle, Keltch, and Swanson, published June 6, 1930, in The Journal of the American Chemical Society, vol. 52, page 2440, particularly on pages 2442 and 2443; which discussed and described various barbituric acids and barbiturates, including propyl-methyl-carbinyl allyl compounds in what is now known to be a somewhat impure state.

I have been able to make, and have made, propyl-methyl-carbinyl allyl barbituric acid, and the corresponding barbiturates, in a substantially pure state, by either procedure referred to above.

My present application is directed to the propyl-methyl-carbinyl allyl barbituric acid and barbiturates whether they are in the somewhat impure state described in my aforesaid parent application Serial No. 387,084 or are in a substantially pure state.

In preparing my new product, I first prepare 2-bromo-pentane from propyl-methyl carbinol. Then, by my preferred method, I prepare the mono-substituted propyl-methyl-carbinyl malonic ester from the 2-bromo-pentane. Then I prepare the mono-substituted propyl-methyl-carbinyl barbituric acid from the mono-substituted propyl-methyl-carbinyl malonic ester, by causing the latter to react with urea in the presence of sodium ethylate. Then I allylate this mono-substituted propyl-methyl-carbinyl barbituric acid, by causing it to react with allyl bromide in the presence of alkali, to produce the di-substituted propyl-methyl-carbinyl allyl barbituric acid. Then, if desired, I may prepare barbiturates from this di-substituted propyl-methyl-carbinyl allyl barbituric acid, by reaction with a suitable base.

Alternatively, I may prepare the di-substituted propyl-methyl-carbinyl allyl malonic ester by reacting the 2-bromo-pentane with allyl malonic ester in the presence of sodium ethylate; and then from that di-substituted ester may prepare the di-substituted propyl-methyl-carbinyl allyl barbituric acid by causing the malonic ester to react with urea in the presence of sodium ethylate.

2-bromo-pentane

The 2-bromo-pentane is obtained by treating the propyl-methyl carbinol with HBr. The HBr may be either aqueous hydrobromic acid, or anhydrous gaseous hydrogen bromide. If aqueous hydrobromic acid is used, it is refluxed with the propyl-methyl carbinol; and yields 2-bromo-pentane which has co-present with it a variable amount of its isomer, 3-bromo-pentane, because of isomerization which occurs in the reaction. On the other hand, if anhydrous gaseous hydrogen bromide is passed into the propyl-methyl carbinol at low temperature, the 2-bromo-pentane obtained is substantially if not wholly free from isomers. This substantially pure 2-bromo-pentane and the method of making it have already been described in the literature.

*Mono-substituted malonic esters*

Mono-substituted malonic esters may be prepared from this 2-bromo-pentane by causing it to react with the desired un-substituted malonic ester. The malonic ester which I produce and use is desirably the ethyl ester, or di-ethyl malonate as it is also called. Therefore, although the methyl ester (di-methyl malonate) or the propyl ester (di-propyl malonate) can be produced and used by my method, I use the term "malonic ester" herein to denote the di-ethyl malonate, save where otherwise indicated. Thus, by "propyl-methyl-carbinyl malonic ester", which I preferably use in preparing my propyl-methyl-carbinyl barbituric acid, I mean the mono-substituted di-ethyl malonate in which one of the methylene hydrogens has been replaced by the propyl-methyl-carbinyl group.

*Propyl-methyl-carbinyl malonic ester*

Propyl-methyl-carbinyl malonic ester (also called 1-methyl-butyl malonic ester) may be prepared from the 2-bromo-pentane as follows:

1 mole of sodium is dissolved in 10 to 12 times its weight of absolute alcohol under a reflux condenser. To this are added 1 mole of malonic ester, and then gradually about 1.1 moles of 2-bromo-pentane. The mixture is gently refluxed for some hours, or until it no longer shows an alkaline reaction to moist litmus paper. Most of the alcohol is removed by vacuum distillation, leaving an oily residue. Water is added to this residue to dissolve the sodium bromide; and the oily layer, which is propyl-methyl-carbinyl malonic ester, is separated and dried. It is purified by fractional distillation in vacuo. When thus purified, propyl-methyl-carbinyl malonic ester is a colorless or pale yellow liquid, having a boiling point of 103–105° C. at about 4 mm. pressure, and a refractive index at 25° C. of about 1.4255 to 1.4263. It is represented by the following formula:

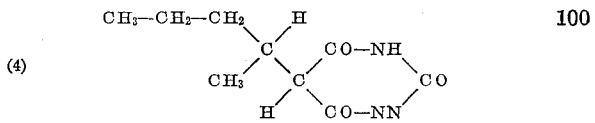

(3)

The 2-bromo-pentane used is desirably in the pure form obtained by the use of anhydrous gaseous HBr; but the form which has some of the 3-bromo-pentane isomer co-present with it, obtained by refluxing with aqueous HBr, may be used, although this requires more subsequent purification.

*Propyl-methyl-carbinyl barbituric acid*

Propyl-methyl-carbinyl barbituric acid (also called 1-methyl-butyl barbituric acid) may be prepared from propyl-methyl-carbinyl malonic ester as follows:

3 moles of sodium are dissolved in 10 to 12 times its weight of absolute alcohol under a reflux condenser. To this are added 1.6 moles of urea and 1 mole of propyl-methyl-carbinyl malonic ester. The mixture is gently refluxed for 2 to 4 hours, after which most of the alcohol is removed by vacuum distillation. The residue is dissolved in water, and a sufficient amount of dilute acid is added to completely precipitate the propyl-methyl-carbinyl barbituric acid. The precipitate is filtered off, dried, and recrystallized from dilute alcohol.

Propyl-methyl-carbinyl barbituric acid is a crystalline solid, which if prepared from 2-bromo-pentane which had some of its isomer 3-bromo-pentane co-present with it and if subjected to only one or two recrystallizations melts at about 164–166° C., corrected. However, by using a pure 2-bromo-pentane, and/or by repeating the recrystallization a large number of times, the melting point may be raised to about 167–168° C., corrected. Propyl-methyl-carbinyl barbituric acid is soluble in alcohol and ether, and insoluble in petroleum ether. It dissolves in aqueous solutions of the hydroxides of the alkali metals. It is represented by the following formula:

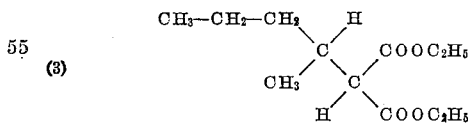

(4)

Its potassium and sodium salts are both white solids, readily soluble in water, and insoluble in ether.

*Propyl-methyl-carbinyl allyl barbituric acid*

Propyl-methyl-carbinyl allyl barbituric acid (also called allyl 1-methyl-butyl barbituric acid) may be prepared as follows:

1 mole of propyl-methyl-carbinyl barbituric acid is dissolved in a suitable vessel in a 10% to 35% aqueous solution of 1 mole of potassium hydroxide. To this are added somewhat in excess of 1 mole of allyl bromide, and alcohol equal to about 10% of the total volume of the solution. The vessel is agitated for 50–75 hours. At the end of this time, the solution, which may still exhibit two layers, is concentrated to about one-half its volume, to remove the excess allyl bromide and the alcohol. On cooling, an oily layer, which is propyl-methyl-carbinyl allyl barbituric acid, separates out as a sticky viscous mass. It is dried, washed with petroleum ether, and dissolved in the minimum amount of benzene. Any unreacted propyl-methyl-carbinyl barbituric acid, which does not dissolve, is filtered off. The addition of petroleum ether to the clear filtrate causes the propyl-methyl-carbinyl allyl barbituric acid to precipitate as an oily mass. This is separated, washed with petroleum ether, and dried in vacuo. After some time it hardens into a whitish solid, which if it was prepared from a 2-bromo-pentane which had some of its isomer 3-bromo-pentane co-present with it has a melting point of about 80–83° C. However, by using a pure 2-bromo-pentane, and/or by recrystallizing a number of times from dilute alcohol, the melting point may be raised, to 98–100° C., corrected. Propyl-methyl-carbinyl allyl barbituric acid is represented by Formula 2 already given.

*Barbiturates*

By causing a reaction of propyl-methyl-carbinyl allyl barbituric acid (whether in substantially pure form with a melting point of 98–100° C. or in the somewhat impure form having some of its isomer di-ethyl-carbinyl allyl barbituric acid co-present with it) in a suitable solvent with either the hydroxide or the ethylate of the desired inorganic base, or with ammonia, or with the desired alkyl amine, the corresponding salt may be obtained. When pure, the sodium salt is a white solid, readily soluble in water and alcohol but insoluble in ether; the magnesium salt is a white crystalline solid, somewhat soluble in water and ether; and the mono-methyl-amine salt is a yellowish solid, soluble in water. The preferred method for obtaining the pure salts is described hereinafter.

These barbiturates may all be represented by Formula 1, with X representing a metal, or ammonium, or an alkyl-substituted ammonium. They are effective hypnotics.

*Alkali-metal salts.*—A solution of one molar proportion of the hydroxide or the ethylate of the inorganic base, such as sodium if an alkali-metal salt is desired, is added to a suspension or solution in a suitable solvent (such as water, dilute alcohol, or absolute alcohol) of one molar proportion of propyl-methyl-carbinyl allyl barbituric acid, to produce the desired barbiturate in solution. The amount of solvent used is desirably sufficient to dissolve the salt thus produced. The solution is filtered; and is then evaporated, preferably under vacuo at low temperature, until the salt is obtained in solid form. If the salt is desired in a stable form sufficiently free from contaminants so that clear water solutions thereof suitable for intravenous injection may be obtained, it may be so obtained by the method set forth in my Patent No. 1,856,792, granted May 3, 1932.

*Sodium propyl-methyl-carbinyl allyl barbiturate*

One part by weight of propyl-methyl-carbinyl allyl barbituric acid is added to enough alcohol to facilitate handling—in this case conveniently about six times its weight. To this is added a solution of sodium hydroxide, preferably carbonate-free or substantially so, containing $$\frac{40}{238}$$

parts by weight of sodium hydroxide, which is the amount of sodium hydroxide necessary to combine in equal molecular proportions with the propyl-methyl-carbinyl allyl barbituric acid. This solution is filtered clear, and is then evaporated under vacuum until the sodium propyl-methyl-carbinyl allyl barbiturate (alternatively named sodium allyl 1-methyl-butyl barbiturate) separates out in solid form. The salt as thus obtained in solid form contains a varying amount of moisture.

If it is desired to have a stable salt substantially free from contaminants, the alcohol used for dissolving the barbituric acid is absolute alcohol, and the sodium hydroxide is added as a very concentrated aqueous solution so that the reaction which occurs to form the salt is in a substantially alcoholic solution. By having a substantially alcoholic solution, decomposition of the salt during the process of drying is effectively avoided; and the drying may be carried to a point where materially less than 1% of moisture remains, so that the salt is substantially anhydrous. In this way a stable salt substantially free from decomposition products formed during preparation or drying or on standing is obtained. This salt may be used safely for making aqueous solutions for intravenous injection; for such aqueous solutions, when freshly made, are clear solutions substantially free from haziness.

Sodium propyl-methyl-carbinyl allyl barbiturate is a white hygroscopic solid, readily soluble in water and alcohol, and insoluble in ether. When $CO_2$ is bubbled through an aqueous solution of it as concentrated as 5%, a precipitate of propyl-methyl-carbinyl allyl barbituric acid occurs. The salt is bitter tasting, and its aqueous solution is alkaline in reaction. The aqueous solution of this salt is not stable, but decomposes on standing. This salt is represented by the following formula:

(5) 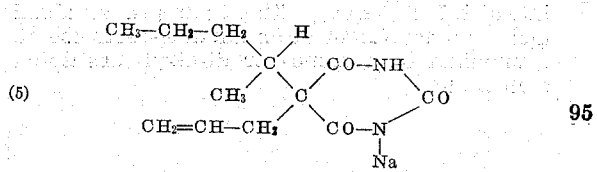

If this salt is prepared from the propyl-methyl-carbinyl allyl barbituric acid which melts at about 98–100° C., it is substantially free from isomers; but if it is prepared from the acid in which the isomer is co-present, a corresponding amount of the isomeric salt is co-present in the salt obtained. This isomeric salt is sodium di-ethyl-carbinyl allyl barbiturate.

*Ammonium propyl-methyl-carbinyl allyl barbiturate*

One part by weight of powdered propyl-methyl-carbinyl allyl barbituric acid is added to somewhat more than a molecular proportion of concentrated aqueous ammonia solution. The barbituric acid dissolves on stirring, forming a thick sirupy solution of ammonium propyl-methyl-carbinyl allyl barbiturate. On standing the salt crystallizes out in solid form, and the excess ammonia and water may be volatilized by a current of air or by placing under vacuum, leaving the ammonium propyl-methyl-carbinyl allyl barbiturate in solid form. Too prolonged exposure to air or vacuum causes a loss of ammonia from the salt, leaving the salt mixed with the free acid.

Ammonium propyl-methyl-carbinyl allyl barbituric acid is a white solid, soluble in alcohol and water. Its aqueous solutions have an alkaline reaction. It is represented by the following formula:

(6) 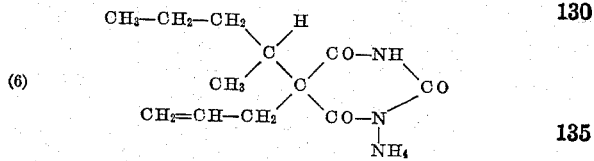

*Alkyl-substituted-ammonium salts.*—1 molar proportion of propyl-methyl-carbinyl allyl barbituric acid is added to somewhat more than a molar proportion of the desired organic base, such as mono- or di-methyl amine or mono- or di-ethyl amine, in aqueous or alcoholic solutions if desired or necessary. The amount of liquid used should be sufficient to ensure complete reaction. The resulting organic-base barbiturate crystallizes out or is concentrated to solid form. The formulas of such organic-base barbiturates correspond in general to Formula 5, for the sodium salt, save that the substituted-ammonium radical, such for instance as the methyl-ammonium radical —NH₃—CH₂ or the di-ethyl-ammonium radical —NH₂(C₂H₅)₂, takes the place of Na.

I claim as my invention:

1. A barbituric compound which is represented by the following formula:

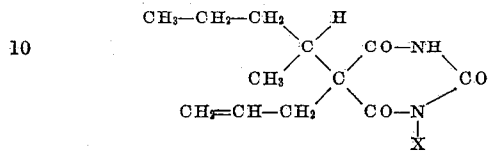

in which X represents either hydrogen, an alkali metal, an equivalent of an alkaline-earth metal, ammonium or a mono- or di-alkyl-substituted ammonium.

2. Propyl-methyl-carbinyl allyl barbituric acid, which is represented by the following formula:

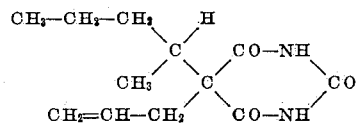

3. Sodium propyl-methyl-carbinyl allyl barbiturate, which is represented by the following formula:

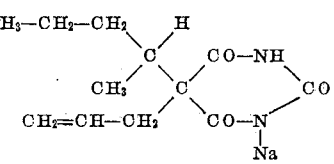

HORACE A. SHONLE.

CERTIFICATE OF CORRECTION.

Patent No. 1,954,429.  April 10, 1934.

HORACE A. SHONLE.

It is hereby certified that error appears in the printed specification of the above numbered patent requiring correction as follows: In the heading, title of invention, between the words "Methyl" and "Carbinyl" insert a hyphen; page 2, line 92, for "large" read larger; and line 104, of formula 4, at the lower right of the formula for "NN" read NH; and that the said Letters Patent should be read with these corrections therein that the same may conform to the record of the case in the Patent Office.

Signed and sealed this 15th day of May, A. D. 1934.

Bryan M. Battey (Seal)  Acting Commissioner of Patents.